Patented Nov. 5, 1946

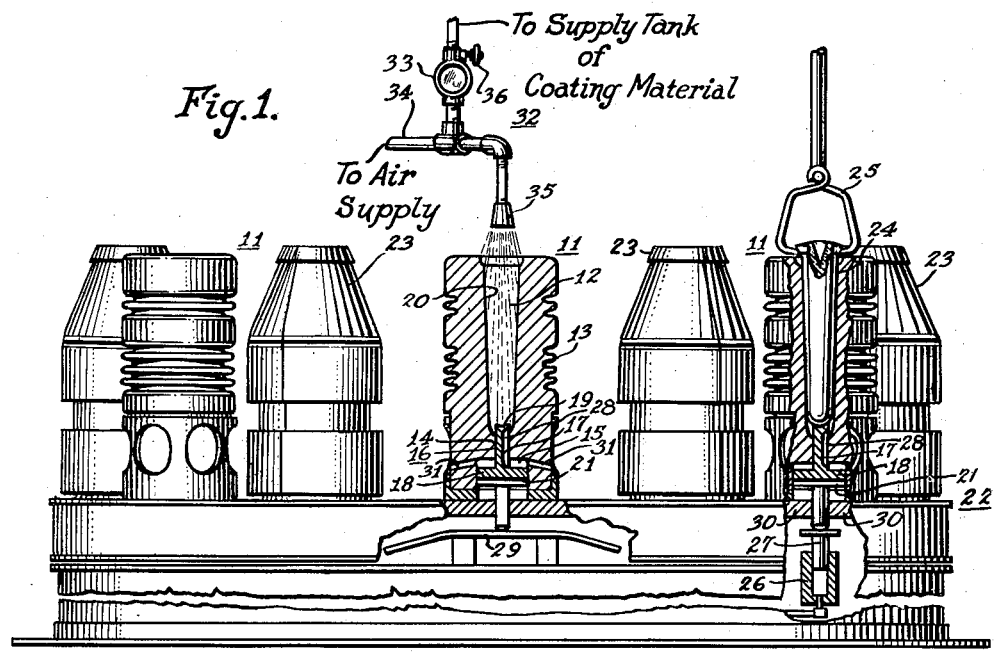
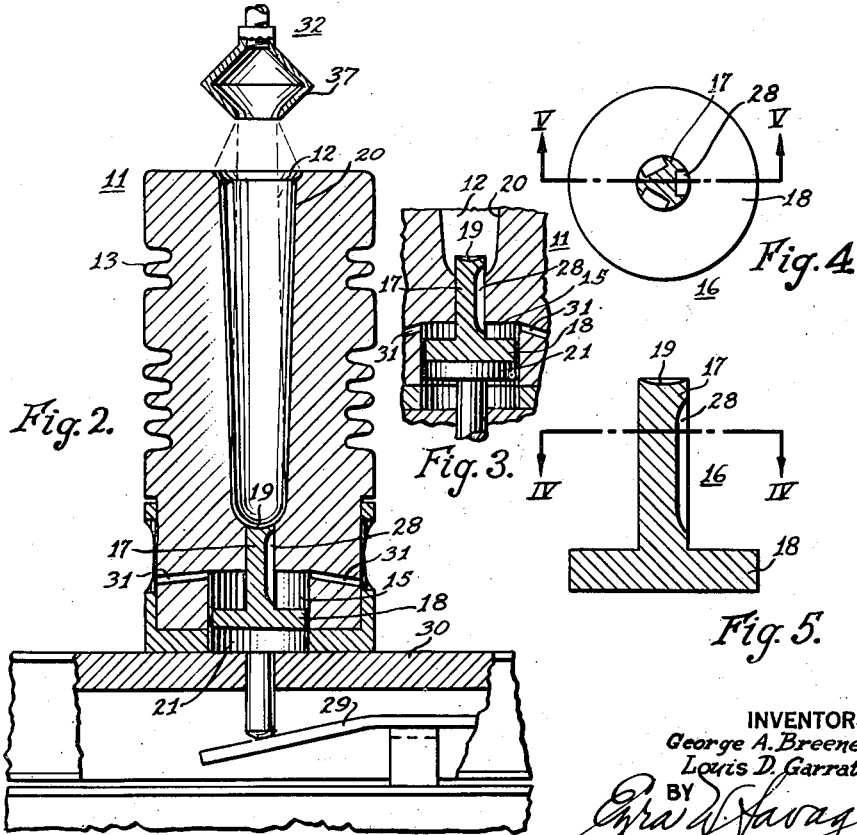

2,410,422

UNITED STATES PATENT OFFICE 2,410,422

GLASSMAKING MACHINERY

George A. Breene, Emlenton, and Louis D. Garratt, New Castle, Pa.

Application December 14, 1943, Serial No. 514,208

12 Claims. (Cl. 49—1)

1

This invention relates generally to glass making machinery and more particularly to molds for glass making machinery.

The object of the invention is to provide for coating a block or blank mold for glass making machinery with graphite or other suitable coating materials to facilitate the feeding of the glass to be molded and the removal of the parisons or blanks.

It is also an object of the invention to provide for a substantially uniform cooling of the metal of the block mold adjacent the cavity face.

The invention accordingly is disclosed in the embodiment thereof shown in the accompanying drawing, and comprises the features of construction, combination of elements and arrangement of parts which will be exemplified in the construction hereinafter set forth and the scope of the application of which will be indicated in the claims.

For a fuller understanding of the nature and objects of the invention, reference should be had to the following detailed description taken in connection with the accompanying drawing in which:

Figure 1 is a view, partly in side elevation and partly in section, of the table of a glass making machine showing a mold constructed in accordance with this invention.

Fig. 2 is an enlarged view, partly in section and partly in side elevation, of a portion of a glass making table showing details of the mold.

Fig. 3 is a view, partly in section and partly in side elevation, of a valve constructed in accordance with this invention disposed in the bottom of the block mold and standing in open or venting position.

Fig. 4 is a view in cross section taken along the line IV—IV of Fig. 5, and

Fig. 5 is a view in cross section taken along the line V—V of Fig. 4.

In the molding of glass, the parisons or blanks employed in the making of many articles are generally made in block molds. These molds may be provided with cavities of any predetermined design depending on the final product to be produced. Generally, the molds are made from gray cast iron and may or may not be provided with external fins to cooperate in the dissipation of heat. When making these molds in order to assure a good product it is necessary to provide mold cavities with highly polished surfaces and one of the big problems in glass making factories is the keeping of these cavity faces in proper condition for molding operations.

2

Since glass molding is carried on at rather high temperatures, it will be readily appreciated that the surfaces of the metal will oxidize rapidly forming scale and also accumulate layers of dirt imported into the cavities with the gobs of glass.

It is common practice in glass molding to drop oil into the mold to effect a certain amount of cooling of the mold. When the oil comes in contact with the hot mold, it is immediately flashed and in burning produces carbon which tends to adhere to the cavity face. In this manner the mold or cavity face becomes coated with carbon from the burned oil. These deleterious materials cause the parisons to stick in the mold, slightly change the size of the mold, and make their imprint in the parisons during molding operations. Such impressions in the parisons can not be removed in the operations which follow in the blow mold.

It has been found in practice that the surfaces of the block molds become so coated with dirt and oxide scale that they have to be removed from the machine once every six to eighteen hours and cleaned. The removal of these molds every six to eighteen hours necessitates a large amount of work in every glass factory. Further, these molds, which are often quite expensive, are damaged in the continued removal operations.

Following the removal of the molds from the machine table, it is necessary to clean them by the use of abrasives. Such cleaning operations entails a large amount of labor. Continued cleaning of the mold increases its cavity size with the result that molds which have been cleaned a number of times require more glass to make the parisons than they did when new. Thus, when the blocks are old, in the process of a run, they may increase the cost of the product appreciably on account of the increase in size of the mold cavity.

Referring now to Figs. 1 and 2 in particular, a block mold shown generally at 11 comprises a casting having a cavity 12 formed therein and presenting a cavity face 20. The cavity 12 may be made of any predetermined shape depending on the parisons it is desired to produce. In the embodiment of the invention illustrated, the cavity 12 is of a simple shape such as is required for the manufacture of milk bottles. In order to accelerate the dissipation of heat from the mold, fins, such as shown at 13, may be provided to increase the outside surface area exposed to the flow of cooling mediums such as air. In glass making factories it is common practice to direct currents of air against the block molds to dissipate the heat, and it is deemed unnecessary to explain such cooling practices.

As illustrated, an opening 14 leads from the bottom of the cavity 12 through the wall of the mold to a chamber 15. A valve shown generally at 16 and comprising a stem 17 and a head 18 is mounted in the bottom of the mold. As shown, the stem 17 extends into the opening 14 while the head 18 is located in the chamber 15. The stem 17 is disposed to slide in the opening 14 to perform an operation that will be described hereinafter.

The upper end of the stem is made concave as shown at 19 to conform to the contour of the cavity face 20. Generally, it is desirable that the concave face 19 of the stem 17 be in exact alignment with the cavity face 20, but for some molding operations it is sufficient if it is in substantial alignment.

The head 18 of the valve in this embodiment of the invention simulates a disk and seats on the head of another valve 21 provided for actuating the valve 16. As shown, the head of the valve 21 is also disposed in the chamber 15, while the stem depends through an opening provided in the table shown generally at 22 and which carries the block molds 10 and blow molds 23.

Valves such as 16 are commonly employed in block molds to loosen the parisons or blanks 24 and to raise them a predetermined distance as best shown on the right of Fig. 1. When the parison has been raised it may be engaged by fingers 25 and removed from the block mold and deposited in a blow mold 23. The mechanism employed for transferring the parisons is well known in the glass making art and a description will not be given.

It is common practice in glass making machinery to effect the raising of the valve 16 as shown at the right in Fig. 1 by means of compressed air. A suitable arrangement for effecting the operation of the valve 16 is by providing a small air cylinder 26 connected to a suitable source of compressed air. At predetermined times in the operation of the table 22, compressed air is admitted to cylinder 26 projecting the tappet 27 upwardly to actuate the valve 21 to raise the valve 16. When the valve 16 is actuated upwardly the parison 24 is raised.

The valve 16 is generally made of cold rolled steel or some other material capable of withstanding the abuse to which it is subjected. The clearance of the valve stem 17 in the opening 14 is usually quite small so as to prevent any possible forming of flash on the bottom of the parisons 24. It is not necessary to fit the head 18 tightly in the chamber 15. In making the head 18 a certain amount of clearance may be provided.

It has been found that a very excellent parting surface may be provided in the block molds 10 by following the teachings of United States Letters Patent 2,246,463, issued to Louis D. Garratt, June 17, 1941. However, in practicing this process it has been found that when the medium carrying the finely divided graphite is delivered into the unvented cavity 12 it builds up pressures which prevent an even distribution of the graphite over the cavity face.

In order to effect an even or substantially even distribution of the coating material over the cavity face and a substantially uniform cooling of the metal adjacent the cavity face, we have provided for venting the mold cavity.

The mold cavity may be vented by providing a valve structure which can be operated to open a passageway leading through the mold. In the preferred embodiment of the invention the stem 17 of the valve provided for unseating or raising the parisons is so grooved or cut at 28 to provide a peripherally reduced portion that it can be utilized to open a passageway to vent the mold cavity. The length and depth of the groove or grooves or peripherally reduced portions and the number of grooves 28 or peripherally reduced portions provided in the stem will depend on conditions to be met. In practice, good results have been obtained in block molds utilized for making milk bottles by providing three grooves, each 1/8" deep when the valve stems were 3/8 to 5/8" in diameter. In a stem about 3" long, we have made the grooves 2 1/4" long and extended them to within 1/4" of the top of the stem. However, anyone skilled in the art can readily determine the size and number of grooves or peripherally reduced portions desirable for a particular operation.

In the embodiment of the invention illustrated in Figs. 1 and 2, a track 29 is provided for actuating the valve 16 to vent the cavity 12. The track 29 is disposed under the top 30 of the table 22 to actuate the valve 16 after the parison 24 has been removed. In locating the track 29, it will be so disposed that it will hold the valve 16 in its uppermost position venting the cavity 12 at the time when a predetermined amount of colloidal graphite is delivered in a manner to be described hereinafter, to cooperate in coating the cavity face.

In some instances it may be sufficient to let the air or other medium provided for carrying the graphite delivered into the cavity 12 leak past the heads of the valves 16 and 21. However, we have obtained good results by providing openings 31 leading from the chamber 15 to the outside of the mold. When openings 31 are employed, a complete passageway is provided through the mold through which the medium carrying the coating material may flow. The passageway includes the cavity 12, the grooves 28 provided in the stem 17, the chamber 15 and the openings 31.

While in this embodiment of the invention we have described and illustrated a track 29 for actuating the valve 16, it is to be understood that the valve can be operated by other equivalent devices such as cams, plungers, etc. disposed to be operated in synchronism with the movements of the table 22. Since such devices and the methods of synchronizing their actuating mechanisms with the other mechanisms of the glass machine are well known in the art, it is not considered necessary to describe them or how they are disposed relative to one another.

In the operation of the block mold, after the parison 24 has been removed, when table 22 is advanced or indexed forward one step the valve 21 is engaged by the track 29 and raised to the position shown in Figs. 1 and 2. When the valve 21 is actuated upwardly, it raises the valve 16 and the cavity 12 is vented through the grooves 28 provided in the stem 17. Thus when a glass making machine equipped with applicants' valve is in operation, the valve 16 is actuated or raised at a predetermined time as the table is rotated or indexed forward. When the valve 16 is raised, it vents the mold through any opening that may be provided in it. Before the valve 21 leaves the track 29 by sliding down the sloping portion best illustrated in Fig. 2, the spraying mechanism shown generally at 32 is operated to deliver a blast of air or other suitable medium carrying colloidal graphite into the cavity 12. Since the valve 16 stands open, pressures will not be built up in the bottom of the cavity as they are in a closed cavity but instead a uniform delivery of the colloidal graphite to the cavity face will be effected. In this manner, after every molding operation, a quantity of graphite is sprayed substantially evenly over the cavity walls.

When the walls of the cavity are first coated with graphite as taught in the foregoing patent and then after each molding operation or any predetermined number of operations supplied with additional graphite, they are protected from oxidation by the atmosphere and kept clean of dirt introduced by the glass. Further, the medium employed to carry the graphite or graphite in suspension in a carrier into the cavity also effects a uniform cooling of the metal adjacent the cavity face, and it is not necessary to employ oil for cooling as has heretofore been common practice. The cooling may be effectively regulated by controlling the amount of cooling medium that flows through the cavity after each molding operation.

The mechanism 32 employed for delivering the colloidal graphite to the mold cavity need not be very complicated. In this embodiment of the invention a sight feed 33 is connected to a tank carrying a coating material such as colloidal graphite in suspension in a suitable carrier such as an oil. This sight feed is connected by means of a T-coupling to a pipe 34 leading from a supply of compressed air (not shown).

When in operation after the compressed air has entrained the colloidal graphite in the sight feed, it is directed into the cavity 12 by the spray head 35. It will be readily appreciated that the air supply may be regulated to any predetermined pressure by well known devices, and that the quantity of colloidal graphite entrained by the carrier medium (air) can be controlled by making predetermined mixtures and setting the valve 36 to govern the flow into the sight feed. It has been found in practice that for M-B machines about six drops of an oil carrying as much colloidal graphite as can readily be kept in suspension is adequate for each discharge into the cavity. Of course this amount may be varied to meet different molding conditions and the requirement of the particular machine.

Many different types of spraying mechanism may be provided. The spray illustrated in Fig. 1 is different from the spray head 37 illustrated in Fig. 2 but both have been found to be satisfactory. A number of different types of spray have been employed with satisfactory results. It is sufficient to say that some suitable spray for delivering the colloidal graphite fairly uniformly dispersed throughout the carrying medium will give satisfactory results.

We have operated glass making machinery equipped with molds having our venting valve. It has been found possible to keep the cavity face sufficiently plated or coated with graphite to prevent scaling, pitting and the deposit of dirt and carbon, thereby rendering unnecessary the frequent changing of the molds and the numerous cleaning operations by means of abrasives that have heretofore been required. It can safely be said that this increases the life of the mold at least two-fold. Further, we have run block molds for 120 days without removing them, and it is thought that they will continue for a much longer period of time in a clean and highly satisfactory operating condition without the necessity of removing them for cleaning purposes. This length of time as opposed to the six to eighteen hours which is the common practice in glass making factories has introduced a great saving in labor and molds.

It is well known that in a six-mold table a gross of ware is lost every day due to the changing of the molds. This loss of ware has been practically eliminated by the use of our vented mold. While the saving of ware is of importance, it is not comparable with the saving on the molds, since these molds are expensive, often running into hundreds of dollars per mold.

It may also be pointed out that the valve 16, since it is properly cooled and not subjected to the constant dropping of cool oil onto it, lasts longer and operates more effectively. The coating of graphite maintained on the cavity wall results in a low coefficient of friction and the parisons may be more readily ejected from the mold by the valve. When the parisons are readily ejected, there is little or no likelihood of marking the lower end and a much more satisfactory product results.

It has been found that on a Hartford Empire M-B machine, the production of a one-pound Spry bottle was increased from 328 gross to 452 gross every twenty-four hours by the use of a block mold provided with this venting valve and means for delivering into the mold cavity after each molding operation a cooling medium carrying colloidal graphite. This increase in production was obtained with the same number of attendants as employed when molds not having our venting valve were used. Since the speed of the machine is a function of the temperature of the molds, the more effective cooling and lubrication obtained by our vented mold enabled an increase in speed and therefore the running of more glass through the machine.

Since with improved lubrication the wear of the mold is negligible, the amount of glass used for making a bottle remains more constant, which, in the process of time also effects a considerable saving in glass. As pointed out hereinbefore, the life of the mold will be greatly increased and the saving in labor costs per month will be substantial. From the foregoing it will therefore be evident that this improvement in block molds is a great advance in the art.

Since certain changes may be made in the above device and different embodiments of the invention can be made without departing from the scope thereof, it is intended that all matter contained in the above description or shown in the accompanying drawing shall be interpreted as illustrative and not in a limiting sense.

We claim as our invention:

1. In glass making machinery provided with a table disposed to be indexed forward, in combination, a block mold having a cavity for receiving a gob of glass and an opening leading from the cavity, the mold being carried by the table, a valve disposed to close the mold opening and cooperative in presenting a substantially continuous cavity face for molding, means cooperative for delivering a medium carrying a material for coating the cavity face into the cavity, and means for effecting the operation of the valve as the table is indexed forward to vent the cavity when the medium carrying the coating material is being delivered thereby to effect a uniform cooling of the inner portion of the mold and the delivery of the coating material to the cavity face.

2. In glass making machinery provided with a table disposed to be indexed forward, in combination, a block mold having a cavity for receiving a gob of glass and an opening leading from the cavity, the mold being carried by the table, a valve slidably disposed in the opening for closing it, the upper end of the valve being curved to cooperate in presenting a substantially continuous cavity face for molding, means cooperative for delivering a medium carrying a material for coating the cavity face into the cavity, and means disposed for actuating the valve as the table is indexed forward to vent the cavity when the medium carrying the coating material is being delivered thereby to provide a passageway through the mold to facilitate the applying of the material for coating the cavity face.

3. In glass making machinery provided with a table disposed to be indexed forward, in combination, a block mold having a cavity for receiving a gob of glass carried by the table, and an opening leading from the cavity, a valve disposed to close the mold opening, said valve having a face in substantial alignment with the cavity face to provide a continuous surface for molding when the valve stands closed and being provided with a groove for venting the cavity when the valve is raised to a predetermined position, means cooperative for delivering a medium carrying a coating material for the cavity face into the mold and means disposed for actuating the valve as the table is indexed forward to vent the cavity through the groove when the medium carrying the coating material is being delivered into the cavity thereby to effect a substantially uniform cooling of the metal in the inner portion of the mold and delivery of the coating material to the cavity face.

4. In glass making machinery provided with a table disposed to be indexed forward, in combination, a block mold having a cavity for receiving a gob of glass and an opening leading from the cavity carried by the table, a valve disposed to close the mold opening and present a face in substantial alignment with the face of the cavity to provide a continuous face for molding, the valve being grooved for venting the mold cavity when actuated to provide a passageway through the mold including the mold cavity and the groove in the valve, means cooperative for delivering under pressure a medium carrying a material for coating the cavity face into the cavity, means associated with the table for actuating the valve and maintaining it in the open position as the table is indexed forward to vent the cavity while the medium carrying the coating material is being delivered into the cavity thereby to effect a substantially uniform cooling of the metal adjacent the cavity face and delivery of the coating material to the mold face.

5. In glass making machinery provided with a table disposed to be indexed forward, in combination, a block mold having a cavity for receiving a gob of glass and an opening leading from the cavity carried by the table, a valve disposed to close the opening in the block mold and co-operative in presenting a substantially continuous cavity face for molding, the valve being adapted to vent the cavity when the valve stands in a predetermined raised position in the mold opening, means cooperative for delivering into the cavity a medium carrying a material to be applied to the cavity face to facilitate molding operations, said medium delivering means being disposed to align with the cavity in the mold when the mold reaches a predetermined position as the table is advanced, and means disposed for actuating the valve as the table is indexed forward whereby the valve stands open when the delivering means is aligned with the cavity.

6. In glass making machinery, in combination, a block mold having a cavity for receiving a gob of glass, a chamber in its lower end and an opening leading from the receiving cavity to the chamber, a table on which the block mold is carried disposed to be advanced step by step, a valve disposed in the chamber to close the opening leading from the glass receiving cavity, the upper end of the valve being shaped to co-operate in presenting a substantially continuous cavity face for molding, the valve being grooved to vent the cavity when it stands in a predetermined raised position in the mold opening, means cooperative for delivering to the mold cavity at predetermined times as the table is advanced a medium carrying a material to be applied to the cavity face to facilitate molding operations, the means for delivering the medium being disposed to align with the mold cavity at a predetermined position as the table is advanced, and means disposed in a predetermined relation to the table to actuate the valve as the table is advanced to vent the glass receiving cavity when the medium carrying the material to be applied to the cavity face is being delivered into the cavity.

7. In glass making machinery, in combination, a block mold having a mold cavity for receiving a gob of glass to be molded, a cylindrical chamber below the cavity, and an opening leading from the mold cavity to the cylindrical chamber, a table on which the block mold is carried disposed to be advanced, means cooperative for delivering a medium carrying a material to be applied to the cavity face to facilitate molding operations into the mold cavity, the medium delivering means being disposed to align with the mold cavity when the table is advanced to a predetermined position, a valve stem slidably disposed in the opening leading from the mold cavity to close it, the upper end of the stem when it stands in position to close the block mold conforming with the inner face of the mold cavity to give a smooth and even cavity surface for molding, a head simulating a piston carried by the valve stem, the head being slidably mounted in the cylindrical chamber to provide a piston and cylinder combination for use in actuating the valve stem, the stem having a groove therein for venting the cavity, and means associated with the table for actuating the valve head and stem to vent the mold cavity through the groove as the table is advanced and when the medium carrying the material to be applied to the mold cavity face is being delivered into the mold cavity.

8. In glass making machinery, in combination, a block mold having a mold cavity for receiving a gob of glass to be molded, a cylindrical chamber below the cavity and an opening leading from the mold cavity to the cylindrical chamber, a table on which the block mold is carried disposed to be advanced step by step, means cooperative for delivering a medium carrying a material to be applied to the cavity face to facilitate molding operations into the mold cavity, the medium delivering means being disposed to align with the mold cavity when the table is advanced to a predetermined position, a valve stem slidably disposed in the opening leading from the mold cavity to close it, the upper end of the stem when it stands in a position to close the opening conforming with the inner face of the mold cavity to give a smooth even mold cavity surface for molding, a head simulating a piston carried by the valve stem, the head being slidably mounted in the cylinder chamber to provide a piston and cylinder combination for use in actuating the valve stem, the stem having a groove therein for venting the cavity, a member depending through the table and in alinement with the head and a track disposed in predetermined relation to the table for effecting the actuation of the valve head and stem through said member to vent the mold cavity through the groove when the medium carrying a material to be applied to the mold cavity face is being delivered into the mold cavity thereby to provide for the flow of the medium downwardly through the opening leading from the cavity to effect an even distribution of the material carried by the medium to the mold cavity and a uniform cooling of the inner portion of the mold.

9. In glass making machinery, in combination, a block mold having a mold cavity for receiving a gob of glass to be molded, a cylindrical chamber below the cavity and an opening leading from the mold cavity to the cylindrical chamber, a table on which the block mold is carried disposed to be advanced step by step, means cooperative for delivering a medium carrying a material to be applied to the cavity face to facilitate molding operations into the mold cavity, the medium delivering means being disposed to align with the mold cavity when the table is advanced to a predetermined position, a valve stem slidably disposed in the opening leading from the mold cavity to close it, the upper end of the stem when it stands in position to close the opening conforming with the inner face of the mold cavity to give a smooth even mold cavity surface for molding, a head simulating a piston carried by the valve stem, the head being slidably mounted in the cylindrical chamber to provide a piston and cylinder combination for use in actuating the valve stem, the stem having a groove therein for venting the cavity, and means associated with the table for actuating the valve head and stem as the table is advanced to vent the mold cavity through the groove when the medium carrying the material to be applied to the mold cavity face is being delivered into the mold cavity, the block mold having an opening leading from the chamber in which the head of the valve is slidably mounted to vent the chamber to prevent the building up of back pressures when the medium carrying the material is being delivered into the cavity.

10. A valve for use in a glass making block mold having a valve opening in its lower end and carrying a cylinder into which the valve opening leads comprising in combination, a valve stem adapted to fit and to be slidably mounted in the valve opening, the upper end of the stem being shaped to conform to the contour of the inner surface of the mold, and a head provided on the lower end of the stem, the head simulating a piston and adapted to be disposed in the cylinder to provide a piston and cylinder combination for actuating the stem, the stem being provided with a groove starting a predetermined distance below the upper end thereby providing an end portion on the stem adapted to close the valve opening when the upper end is aligned with the inner surface of the mold, the groove being so disposed that it will vent the mold when the stem is raised a predetermined distance in the valve opening.

11. A mold and valve combination for glass making machinery comprising in combination a block mold having a cavity for receiving a gob of glass, a chamber provided on the lower end of the block mold, the block mold having a valve opening leading from the mold cavity into the chamber, a valve stem disposed in the valve opening, the upper end surface of the stem being shaped to conform to the cavity surface, a predetermined portion of the upper end of the stem being fitted to close the valve opening when the upper end surface of the stem aligns with the cavity surface, the stem having a groove cut therein, the groove starting a predetermined distance below the upper end of the stem, and a head carried by the lower end of the stem, the head being disposed in the chamber for actuating the valve stem, the groove in the valve stem being long enough when the valve stem stands in a predetermined position to vent the cavity through the lower end of the mold.

12. A mold and valve combination for glass making machinery comprising in combination a block mold having a cavity for receiving a gob of glass, a vented chamber provided on the lower end of the block mold, the block mold having a valve opening leading from the mold cavity into the chamber, a valve stem disposed in the valve opening, the upper end surface of the stem being shaped to conform to the cavity surface, a predetermined portion of the upper end of the stem being fitted to close the valve opening when the upper end surface of the stem aligns with the cavity surface, the stem having a groove cut therein, the groove starting a predetermined distance below the upper end of the stem, and a head carried by the lower end of the stem, the head being disposed in the chamber for actuating the valve stem, the groove in the valve stem being long enough when the valve stem stands in a predetermined position to vent the cavity through the lower end of the mold.

GEORGE A. BREENE.
LOUIS D. GARRATT.